United States Patent [19]
Knight et al.

[11] Patent Number: 6,003,612
[45] Date of Patent: Dec. 21, 1999

[54] SOD REPLANTING TINE WITH A BIASED SLIDABLY POSITIONED PLUG EJECTOR AND METHOD OF USING

[76] Inventors: Harry Knight, 13916 Huntley Ave., Baton Rouge, La. 70816; Kinsey V. Estess, 4605 Harding St., Baker, La. 70714; Ernest Randall New, 6060 Highway 13, #6, Zachary, La. 70791

[21] Appl. No.: 08/904,640

[22] Filed: Aug. 1, 1997

[51] Int. Cl.⁶ .................................................. A01B 45/04
[52] U.S. Cl. .............................................. 172/20; 172/22
[58] Field of Search .................................. 172/22, 21, 19, 172/20, 25, 101; 111/118, 122, 119, 120, 121; 175/403

[56] References Cited

U.S. PATENT DOCUMENTS

| | | | |
|---|---|---|---|
| 3,113,534 | 12/1963 | Wessel | 172/22 |
| 3,586,109 | 6/1971 | Eversole | 172/22 |
| 3,794,121 | 2/1974 | Drozak | 172/21 |
| 3,797,577 | 3/1974 | Killion et al. | 172/22 |
| 3,926,131 | 12/1975 | Collins | 172/21 X |
| 4,632,189 | 12/1986 | Rizzo | 172/22 |
| 4,662,456 | 5/1987 | Classen | 172/22 |
| 5,207,278 | 5/1993 | Hatlen | 172/21 X |
| 5,398,767 | 3/1995 | Warke | 172/21 |
| 5,495,895 | 3/1996 | Sakamoto | 172/22 |

FOREIGN PATENT DOCUMENTS

| | | | |
|---|---|---|---|
| 191646 | 1/1923 | United Kingdom | 172/22 |
| 355162 | 8/1931 | United Kingdom | 172/22 |
| 522286 | 6/1940 | United Kingdom | 172/22 |

*Primary Examiner*—Victor Batson
*Attorney, Agent, or Firm*—Roy, Kiesel & Tucker

[57] ABSTRACT

The present invention provides a sod plug cutting and replanting device having a body with a sod plug retention cavity formed therein. The device further includes a cutting surface positioned at a lower section of the body such that the cutting surface will cut a plug of sod prior to the plug entering the plug retention cavity. The device also has a connector attached to the body such that the body may be fixed to a device for driving the body into the sod. The invention also provides a method for harvesting a section of sod by inserting into the section of sod a cutting device having a opening formed within the parameter of a cutting edge such that a plug of sod is separated from the section of sod. The method further includes positioning the plug of sod in the ground below a predetermined depth of the section of sod; and cutting the sod section at the predetermined depth such that the plug of sod remains in the ground when the section of sod is removed.

14 Claims, 5 Drawing Sheets

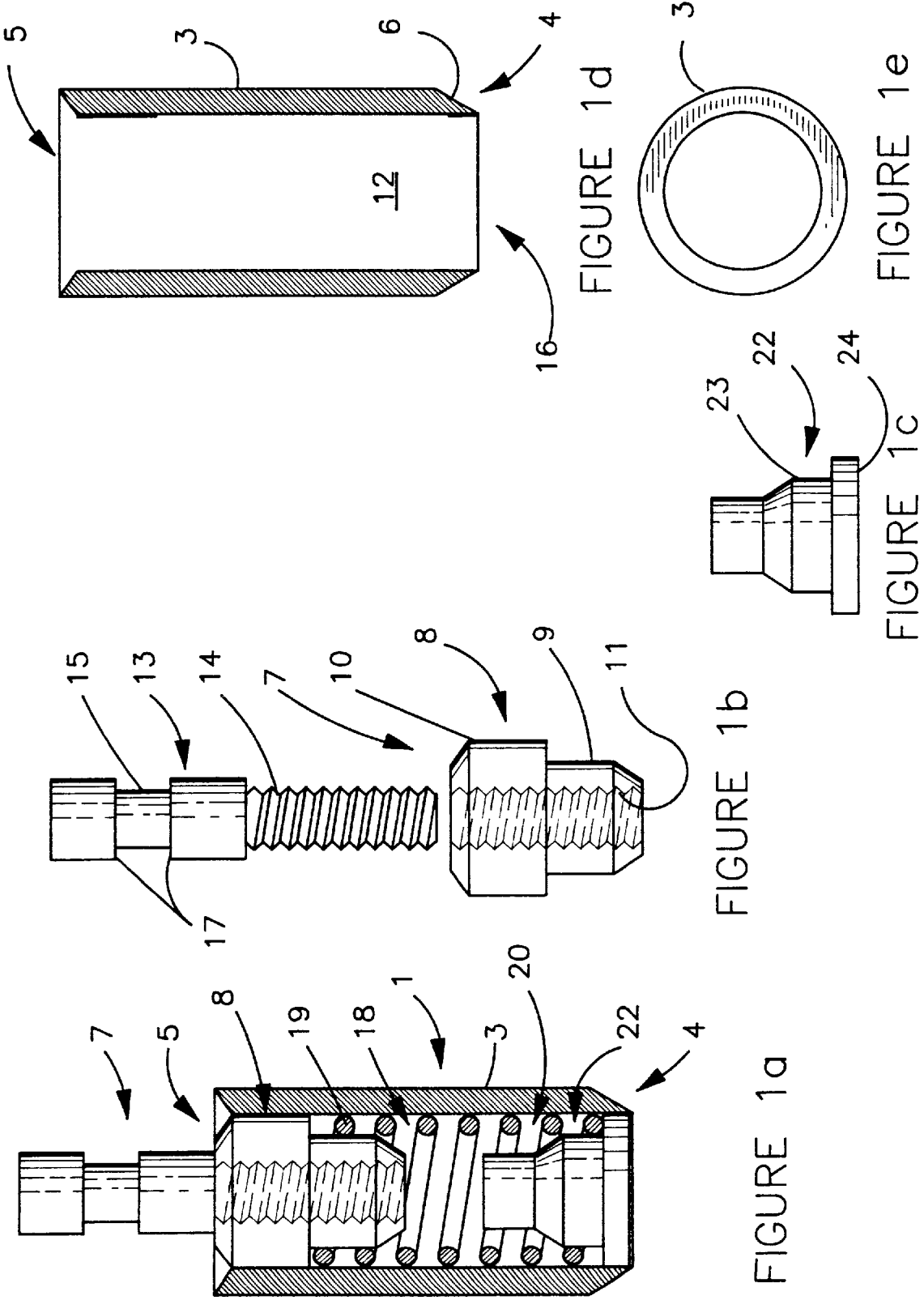

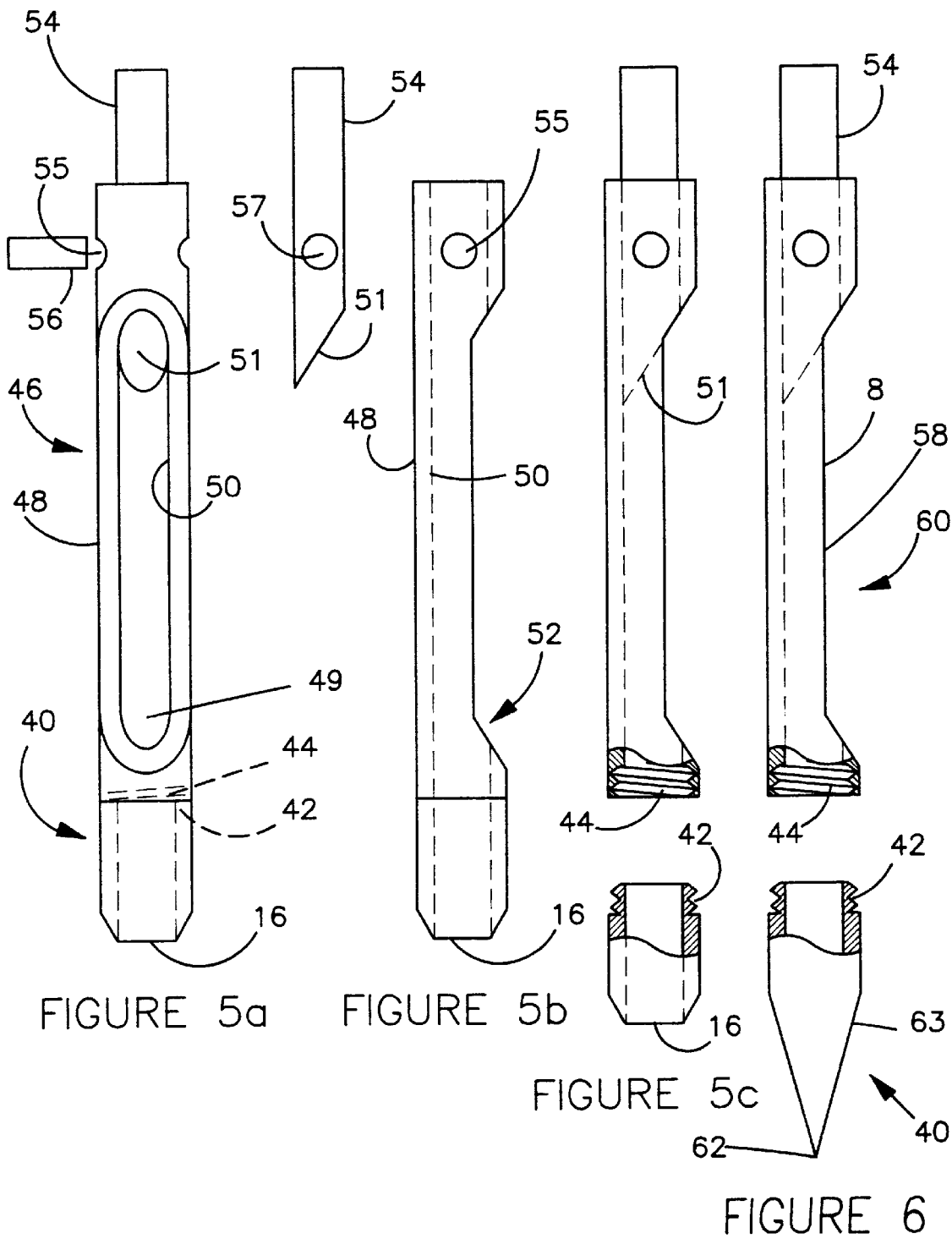

SOD REPLANTING TINE WITH A BIASED SLIDABLY POSITIONED PLUG EJECTOR AND METHOD OF USING

BACKGROUND OF THE INVENTION

TECHNICAL FIELD

The present invention relates to devices for harvesting sections of grass laden soil or "sod" that are intended for transplanting to areas where a well-formed grass surface is needed. More particularly, the present invention relates to a device which automatically replants the harvested area by pressing into the ground small portions or "plugs" of the sod prior to harvesting the remaining surface area of sod.

The conventional practice in harvesting sod is to cut the sod from the ground surface in rectangular strips. Traditionally the sod will be cut in sections approximately 16" wide by 24" long. The sod sections are cut in alternating strips in order to leave sufficient areas of undisturbed grass such that the sod field is able to regrow grass on the barren areas from which the sod was removed. The widths of these undisturbed strips of grass typically vary from approximately ½ inch to approximately 4 inches depending on the variety of grass. However, the larger the undisturbed strips are, the less efficient the harvest is since a large percentage of the sod remains unharvested. On the other hand, if the undisturbed strips are made narrower, the field will take longer to recover for another harvesting. Furthermore, after the original strips of sod have been removed, the sod tends to regrow in uneven sections leaving a field that is nonuniform and difficult to harvest in the future. These uneven strips of sod may also tend to alter the natural drainage of the field, thereby causing erosion and damage to the soil.

Newer harvesting equipment allows sod to be cut in a continuous section and the sod to be rolled up as the harvesting machine proceeds down the sod field. While it is possible with this equipment to cut wider sections of sod (approximately 30" to 48"), these wider sections make it extremely difficult if impossible for the remaining strips of grass to regrow over a 30" section of barren ground within a reasonable length of time. What is needed in the art is a device and method of harvesting sod that will overcome these disadvantages and allow virtually the entire sod field to be harvested.

OBJECTS AND SUMMARY OF INVENTION

It is an object of the present invention to provide an improved apparatus and method of harvesting sod.

It is a further object to provide a method and apparatus that do not require leaving strips of sod in the sod field being harvested.

It is also an object to provide a method and apparatus that will leave a uniformly cut surface in the sod field when the harvesting is completed.

It is still another object to provide a method and apparatus that allow the sod field to regrow much more quickly than hereto known in the art.

Finally, it is an object to provide a method and apparatus that will provide aerated sod sections when the harvesting is complete.

Therefore, the present invention provides a sod plug cutting and replanting device having a body with a sod plug retention cavity formed therein. The device further includes a cutting surface positioned at a lower section of the body such that the cutting surface will cut a plug of sod prior to the plug entering the plug retention cavity. The device also has a connector attached to the body such that the body may be fixed to a device for driving the body into the sod.

The invention also provides a method for harvesting a section of sod by inserting into the section of sod a cutting device having an opening formed within the parameter of a cutting edge such that a plug of sod is separated from the section of sod. The method further includes positioning the plug of sod in the ground below a predetermined depth of the section of sod; and cutting said sod section at the predetermined depth such that the plug of sod remains in the ground when the section of sod is removed.

BRIEF DESCRIPTION OF THE DRAWINGS

FIG. 1a is a cross-sectional view of the sod cutting tine illustrating its various components.

FIG. 1b is a cross-sectional view of the end cap of the sod cutting tine.

FIG. 1c is a side view of the ejector of the sod cutting tine.

FIG. 1d is a side cross-sectional view of the body of the sod cutting tine.

FIG. 1e is a top cross-sectional view of the body of the sod cutting tine.

FIG. 3a is a cross-sectional view of an alternate embodiment of the present invention.

FIG. 3b is an exploded view of the internal components of the alternate embodiment seen in FIG. 3a.

FIG. 3c is a cross-sectional view of the embodiment of FIG. 3a more distinctly illustating the replaceable tip of this embodiment.

FIG. 5a is a frontal view of another alternate embodiment of the present invention illustrating an aerating tine having a removable cutting tip.

FIG. 5b is a side view of the embodiment seen in FIG. 5a.

FIG. 5c is a side view of the embodiment seen in FIG. 5a more distinctly illustrating the replaceable tip of this embodiment.

FIG. 6 is an alternate aerating tine having a removable cutting tip.

DETAILED DESCRIPTION

Figures 2A, 2B, 2C, 2D, 2E:
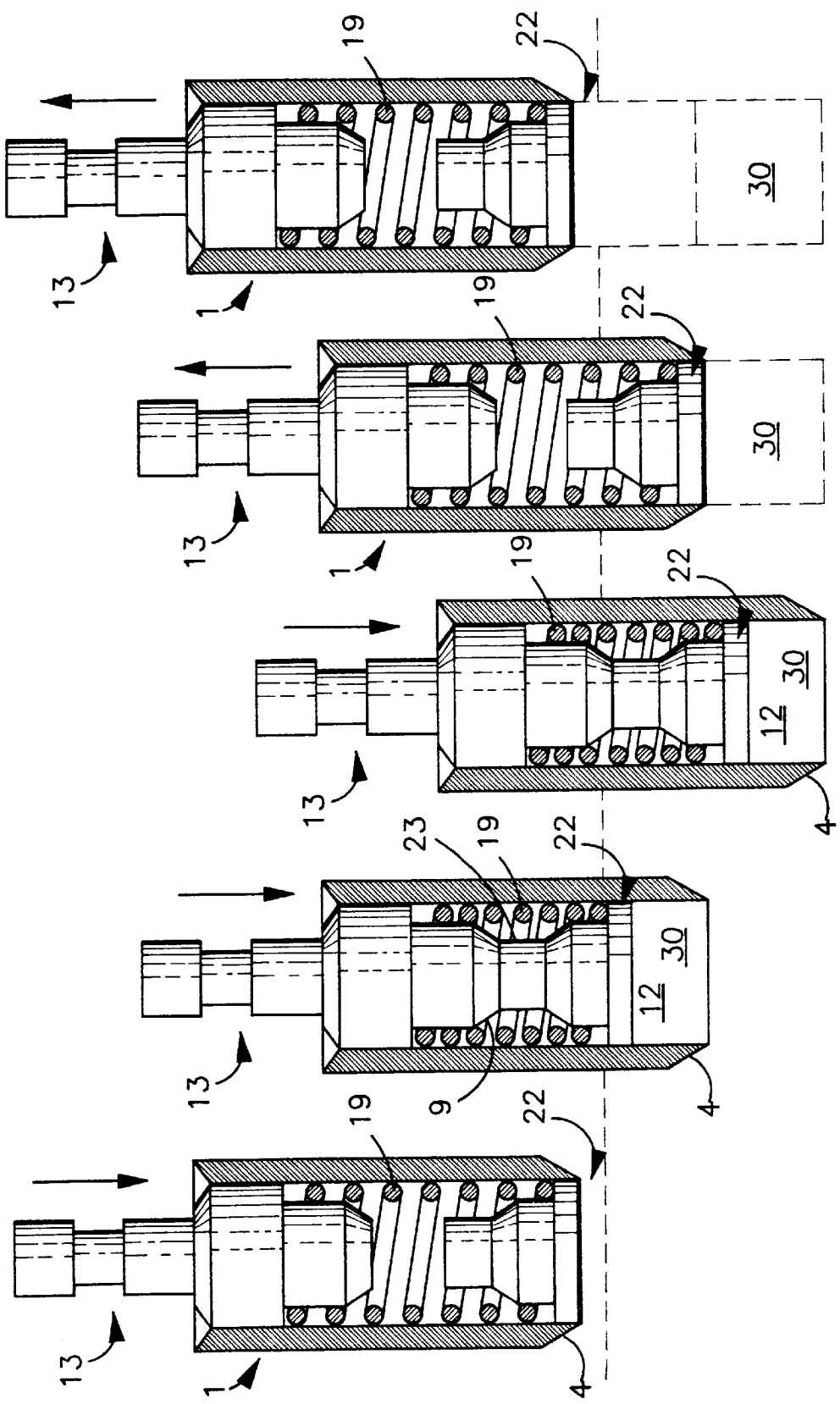
FIGS. 2a–2e illustrate the sequence of movement that the sod cutting tine performs in its typical operation.

FIG. 1a illustrates one preferred embodiment of the present invention, sod cutting tine 1. Sod cutting tine 1 generally comprises a body 3, a connector 7, and an ejector device 22.

As best seen in FIG. 1d, body 3 will comprise a generally tubular member having an upper section 5, a cutting surface 4 and a sod retaining cavity 12. In the embodiment shown, sod retaining cavity 12 will not include the entire interior of body 3. Rather retaining cavity 12 will generally comprise the interior portion of body 3 located below ejector 22 when it is in the raised position (seen in FIG. 2b which is explained in greater detail below). Therefore, body 3 need not be completely tubular or hollow along its entire length. The present invention includes within its scope any body 3 having some type of sod retaining cavity 12 or a functionally equivalent structure. Additionally, in the embodiment illustrated in FIG. 1e, body 3 comprises a cylinder having an O.D. of approximately 2.0 inches and an I.D. of approximately 1.6 inches; however, those skilled in the art will recognize that these dimensions may vary greatly while still allowing body 3 to function as intended. With an I.D. of approximately 1.6 inches, the retaining cavity 12 will have a cross-sectional area of approximately 2 square inches. Furthermore, while FIG. 1e illustrates a body 3 having a circular cross-section, body 3 should not be considered as limited to any particular geometric shape.

Cutting surface 4 is formed on a lower section of body 3 and generally defines that area of body 3 forming the entrance or mouth 16 of body 3. In the embodiment of FIG. 1d, cutting surface 4 tapers to form a cutting edge 6 which will allow body 3 to more easily penetrate the sod and underlying soil. Nevertheless, such a cutting edge 6 is not strictly needed to practice the invention and cutting surface 4 could also simply comprise the blunt untapered end of body 3 or any other cutting parameter that is capable of penetrating sufficiently deep into the sod and underlying soil in order to separate a small portion or "plug" of sod from the surrounding sod.

A connector 7 will be attached to the upper section 5 of body 3. A preferred embodiment of connector 7 is seen in FIG. 1b. In this embodiment, connector 7 comprises an end cap 8 and a connector shank 13. End cap 8 will further comprise a head portion 10, a neck portion 9 and a threaded aperture 11 traversing at least part of the length of end cap 8. Connector shank 13 will have a threaded length 14 for engaging threaded aperture 11 and a collar section 15 for attachment to the machinery which will drive sod cutting tine 1 into the soil. Collar 15 will be formed between an upper and lower shoulder 17. The purpose of collar 15 is to provide a recessed surface between shoulders 17 which a set screw may engage. Thus any slippage between connector shank 13 and the set screw will be limited to the point at which the set screw contacts a shoulder 17. However, connector 7 and connector shaft 13 could take innumerable forms as long as they provide a secure connection between sod cutting tine 1 and the driving machinery. While end cap 8 of connector 7 may be attached to body 3 by any conventional means, in the embodiment shown, end cap 8 is welded to body 3.

It is also necessary for sod cutting tine 1 to have some type of stop device which will limit the amount of sod and soil entering into cavity 12 and which will provide a surface for driving the sod plug further into the soil. In FIG. 1a, a stop device 20 comprises an ejector 22 which is slidably positioned in body 3. The travel of ejector 22 will range between an upper position or fully open position (see FIG. 2c) and a lower position or fully closed position (see FIG. 2a). When ejector 22 is in an upper position, such as when sod cutting tine 1 is forced into the ground, cavity 12 will be open such that sod and soil will be able to enter cavity 12. Conversely, when ejector 22 moves into the lower position, cavity 12 becomes closed such that ejector 22 rests at cutting surface 4. The embodiment of ejector 22 seen in FIG. 1c includes an ejector foot 24 which will be sized to closely fit within the interior walls of cavity 12 such that ejector 22 may slide within those interior walls but will prevent soil and sod from passing therebetween. Ejector 22 will also include a neck portion 23 which allow attachment of a biasing device 18 as seen in FIG. 1a. Biasing device 18 will be positioned on body 3 such that ejector 22 is biased in a downward position closing off cavity 12 as described above. In the embodiment shown in FIG. 1a, biasing device 18 is spring 19 with a first end attached to neck portion 9 of end cap 8 and a second end attached to ejector neck 23. While this embodiment illustrates a spring 19 internal to body 3 acting as biasing device 18, biasing device 18 is intended to include all structures and materials for biasing ejector 22 downwardly, whether internal or external to body 3.

Figure 4:
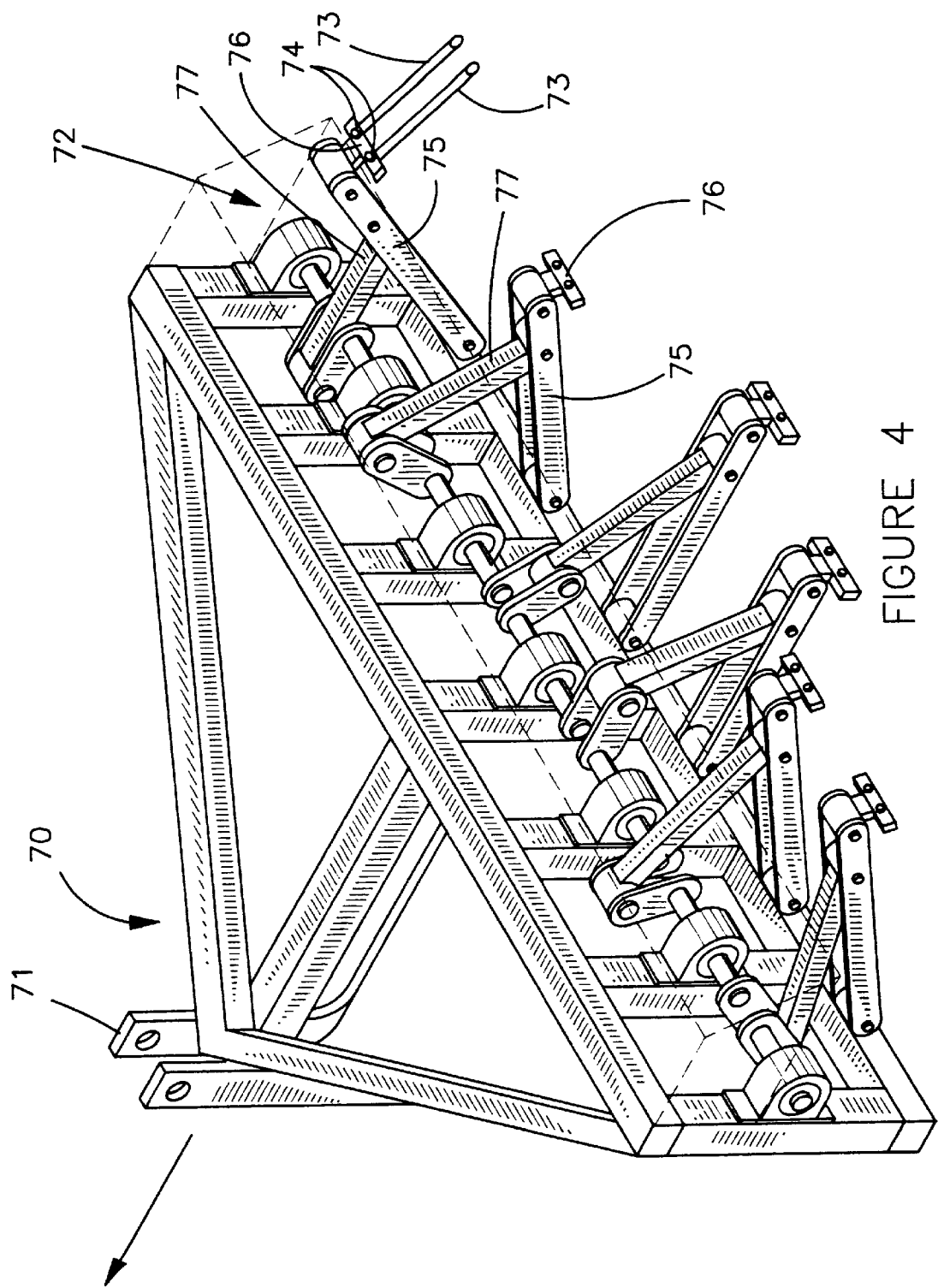
FIG. 4 is a perspective view a conventional turf aeration device to which the sod cutting tines may be attached.

In operation, sod cutting tine 1 will be attached to various types of machinery that are capable of driving sod cutting tine 1 into the soil. One type of machine suitable for this purpose is a turf aerator which drives a series of tines into the soil at predetermined intervals in order to aerate the soil and provide optimum growing conditions for the turf or grass. FIG. 4 illustrates one such conventional turf aerating machine 70. Turf aerator 70 is of the type which is mounted on a conventional tractor. Three hitching points 71 (only one of which is visible in FIG. 4) will secure turf aerator 70 to the tractor. While not shown, a pipe roller will maintain turf aerator 70 at the desired height above the ground as the turf aerator travels along the ground to be aerated. A crank shaft 72 will traverse the width of turf aerator 70 and will receive rotative power from the tractor by either the tractor's power take off (PTO) or by any other conventional means. As is well known in the art, crank shaft 72 will in turn move a series of linkage arms 75 and connecting rods 77 causing an up and down motion of tine head 76. Conventional aerating tines 73 are then attached to tine head 76. While FIG. 4 illustrates only one set of tines 73 attached to turf aerator 70, it will be understood that each tine head 76 will have a pair of tines 73. Set screws 74 will hold tines 73 securely in tine heads 76. It will be understood that set screws 74 will engage the collar 15 of connecting shank 13 which is seen in FIG. 1b. By forming connector shank 13 with an equivalent diameter to the connecting shafts of conventional aerating tines such as tines 73, sod cutting tine 1 may easily be substituted for these aerating tines and installed on existing turf aerators. Other conventional turf aerators may be seen in U.S. Pat. No. 4,422,510 to DeRidder and U.S. Pat. No. 5,570,746 to Jones et al.

FIGS. 2a–2e illustrate how sod cutting tine 1 will operate when attached to driving machinery. The bold arrows in FIGS. 2a–2e depict the direction sod cutting tine 1 is traveling (i.e., being driven into the ground or being withdrawn therefrom). FIG. 2a represents sod cutting tine 1 on the downward stroke prior to entering the ground. At this point, ejector 22 is biased in the downward position such that cavity 12 is closed. As sod cutting tine 1 enters the ground (FIG. 2b), cutting surface 4 will cleanly cut the surface of the sod into a sod plug 30 and will continue to penetrate into the ground. It is one object of cutting surface 4 to sever all roots linking sod plug 30 to the surrounding soil. Otherwise, these roots might pull sod plug 30 out of the ground with the surrounding sod as it is harvested. The movement of sod cutting tine 1 into the ground will overcome the force of spring 19 and raise ejector 22 allowing the cut sod plug 30 to enter cavity 12. The sod plug 30 will continue to enter into cavity 12 until spring 19 reaches its maximum compressive force or neck portion 9 of end cap 8 meets ejector neck 23. After this point, ejector 22 can no longer move in an upward direction and continued downward movement of sod cutting tine 1 will drive sod plug 30 into the ground below the surface of the surrounding sod. As described above, sod harvesting machinery will cut the sod sections at a given depth below the sod surface. Therefore it is necessary to drive sod plug 30 sufficiently far below the sod surface that sod plug 30 will not be disturbed by the harvesting process. Ideally, the sod plugs 30 are driven just deep enough to avoid being cut by the harvesting machinery such that sod plugs 30 will be positioned at the new surface elevation of the ground after the sod field has been harvested. This provides the best potential for the sod plugs to quickly regrow the harvested sod field. Conventional sod harvesting machines typically cut the sod sections approximately ½ inch below the ground surface. The embodiment of sod cutting tine 1 seen in the figures will be designed to allow ejector 22 to move upward approximately 1 inch before neck portion 9 of end cap 8 meets ejector neck 23 and prevent any further upward movement of ejector 22. Therefore sod cutting tine 1 will be driven into the ground approximately 1 inch filling cavity 12 with a sod plug 30 before sod plug 30 is driven below the ground surface. Since conventional sod harvesting machinery typically cuts the sod sections approximately ½ inch below the ground surface, sod cutting tine 1 must be driven approximately ½ inch further into the ground to insure sod plug 30 is driven deeply enough not to be disturbed by the harvesting of the surrounding sod section.

As sod cutting tine 1 reaches its maximum penetration into the ground, sod cutting tine 1 will begin its upper stroke withdrawing from the ground. As it does so, spring 19 will begin to move ejector 22 downward in order to insure that frictional forces between the internal walls of cavity 12 and sod plug 30 do not cause sod plug 30 to remain in cavity 12 or cause sod plug 30 to be pulled up above the desired depth at which sod plug 30 was planted. At the end of its upward stroke, sod cutting tine 1 will be completely withdrawn from the ground as seen in FIG. 2e. During the time sod cutting tine 1 is withdrawn from the soil and prior to reentering the ground on the next downward stroke, the driving machinery will progress a predetermined distance in order that the next sod plug 30 will be space the desired distance from the previous sod plug 30. Depending on the soil type, not all embodiments of the present invention will require an ejector 22 to remove the sod pug 30 from cavity 12. For example, in sandy soils the friction between the internal walls of cavity 12 and sod plug 30 may be so little that there is no tendency for sod plug 30 to be retained in cavity 12. In these situations, ejector 30 may not be required and any stop device 20 may be fixedly positioned inside body 3 leaving sufficient space between cutting surface 4 and stop device 20 in order to form a suitable cavity 12. Stop device 20 will allow a sod plug 30 to enter cavity 12 but will provide the resisting surface needed to drive sod plug 30 to a sufficient depth into the ground as sod cutting tine 1 reaches its maximum travel on the downward stroke.

As mentioned above, turf aerators are one type of machinery that may be used to drive sod cutting tines 1 into the ground. Turf aerators may be adjusted to vary the distance between where the tine leaves the ground surface and where the tine next enters the ground along the path of the turf aerator's travel. Therefore, the aerator may be adjusted to vary the number of plugs planted into the ground for a given area of soil harvested. While the spacing of plugs may vary considerably depending on the type of soil harvested and local field conditions, it has been found that planting sod plugs twelve inches on center is an acceptable spacing. Twelve inches on center means twelve inches between adjacent tines and twelve inches between plugs along the turf aerator's path of travel.

Whenever any type of tine is repeatedly driven into the ground, the walls of the tine body become progressively thinner as friction between the tine and the ground wear away the surface of the tine. This wear is most pronounced at the cutting surface or tip of the tines. The wear along the tips of the tines eventually becomes so acute that the tips fracture or break off. It is thus necessary to discard tines with broken tips even though the remaining portions of the tine would have a considerably longer useful life. Therefore, it would be a significant advantage to provide a tine with a replaceable tip.

Figures 3A, 3B, 3C:
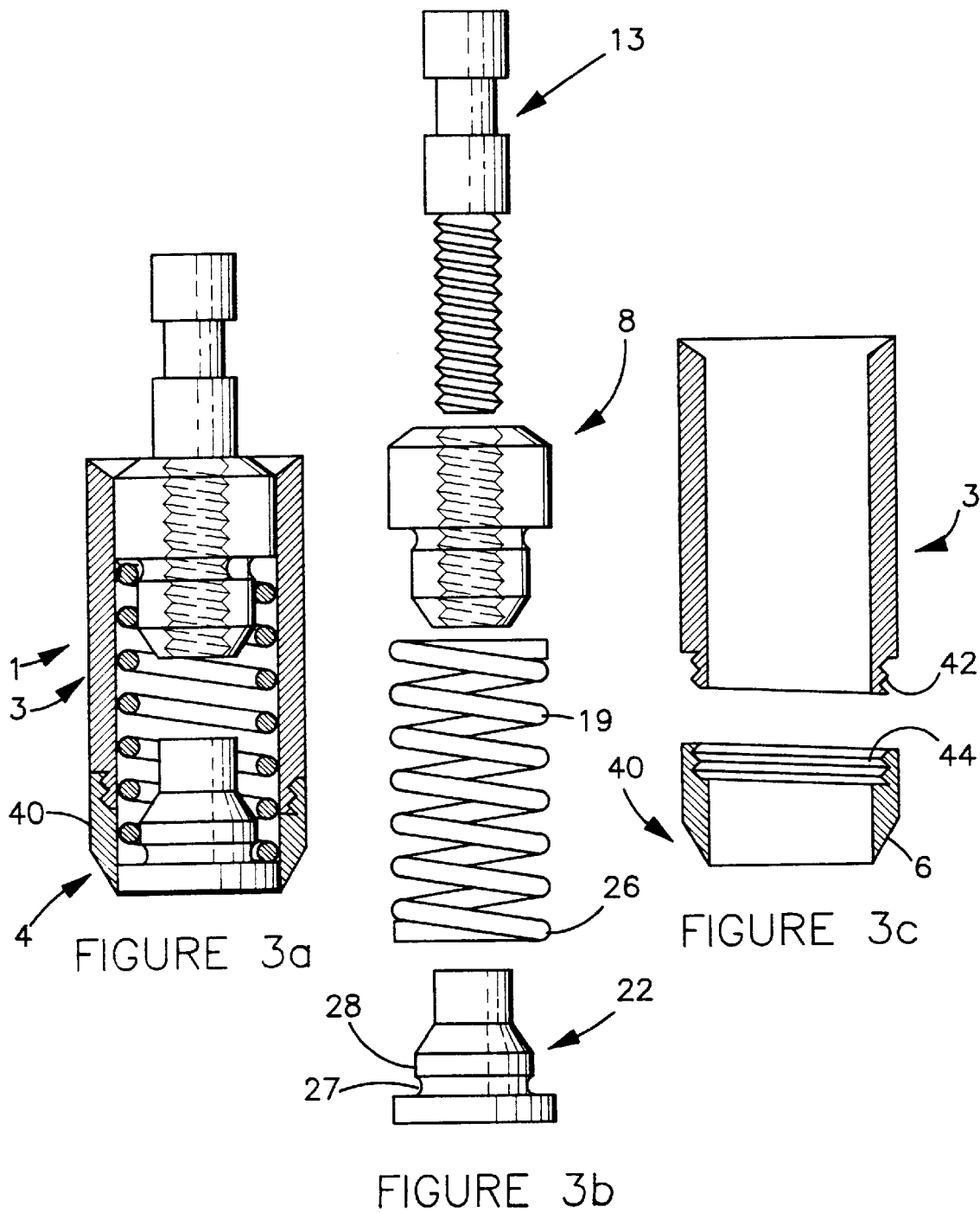

A modification of the present invention is illustrated in FIGS. 3a–3c. FIG. 3a shows a sod cutting tine 1 having a cutting surface 4 formed by a replaceable cutting tip 40. As best seen in FIG. 3c, this embodiment of cutting tip 40 will comprise a second connector half 44 formed on an upper section of cutting tip 40 and a cutting edge 6 on a lower section of cutting tip 40. Second connector half 44 will matingly engage and be removably attachable to first connector half 42 which is positioned on a lower section of body 3. In the embodiment shown in FIG. 3a, connector halves 42 and 44 are threaded members with connector half 42 comprising the male threads and connector half 44 comprising the female threads. Of course, the definition of connector halves 42 and 44 are intended to include all other connecting means, including but not limited to pins, snap rings and the like.

FIG. 3b also illustrates an alternate embodiment of ejector 22. In this embodiment, ejector 22 will comprise a crown section 28 and a beveled section 27. When the sod cutting tine 1 is assembled, ejector 22 will be pressed into engagement with spring 19 as seen in FIG. 3a. The diameter of crown section 28 will be slightly larger than the diameter of spring 7 when it is in the relaxed state. Pressing ejector 22 into the end 26 of spring 19 will cause spring end 26 to expand over crown section 28 and then contract into beveled section 27. In this manner, spring end 26 will more securely grip ejector 22 and better resist any force tending to pull ejector 22 out of engagement with spring 19.

FIG. 6 illustrates a related device which penetrates the soil, but does so for aeration purposes and not to position a sod plug at a predetermined depth. The purpose of aeration tine 60 is to penetrate, loosen and aerate the soil below the ground surface in order to promote growth of the grass or turf. Aeration tine 60 will have a replaceable cutting tip 40 and connector halves 42 and 44. Like the embodiment seen in FIG. 3c, a preferred embodiment of connector halves 42 and 44 will comprise male and female sections, but alternate embodiments could comprise any connector means. However, unlike the tine of FIG. 3c, the replaceable cutting tip 40 of aerating tine 60 will have sides 63 which taper to a point 62. Tapered sides 63 and point 62 will facilitate the penetration of tine 60 when turf aerating machinery drives tine 60 into the ground. When tine 60 is withdrawn from the ground, it leaves a bore hole which allows oxygen and moisture to more easily reach below the ground surface. While aeration tine 60 illustrates a hollow body 58 similar to the body 48 disclosed in FIGS. 5a–5c (described below), the body 58 of aeration tine 60 could take on any shape that would support a replaceable cutting tip 40, such as a completely solid body 58. Aeration tine 60 of the illustrated embodiment employs a hollow body 58 simply to allow body 58 to be standard and interchangeable with body 48 of the below described aeration tine 46.

An alternative aeration tine is shown in FIGS. 5a–5c. Aeration tine 46 will also comprise a replaceable cutting tip 40 and connector halves 42 and 44. However, the cutting tip 40 of FIGS. 5a–5c will have a mouth 16 similar to sod cutting tine 1 seen in FIGS. 1 and 2. The body 48 of aeration tine 46 will have sidewalls 50 which form a cavity 49 traveling along the length of tine 46 and communicating with mouth 16. A pinning aperture 55 will be formed in an upper section of body 48. Body 48 will also have a section of sidewall 50 removed in order to form a soil outlet 52 in the side of body 48. Aeration tine 46 will also have a connector shank 54 with an aperture 57 formed therethrough. Connector shank 54 slides into body 48 and is secured there by connector pin 56 being positioned through aperture 55 and aperture 57. As seen in FIG. 5b, the bottom end of connector shank 54 will have an inclined surface or inclined wall 51. When connector shank 54 is positioned in tine body 48, inclined surface 51 forms the end of channel 52, as illustrated by FIGS. 5a and 5c.

Aeration tine 46 and aeration tine 60 illustrate a connector shank 54 that does not have a connector collar 15 as seen in FIG. 1b illustrating sod cutting tine 1. As discussed above, the purpose of collar 15 is to allow set screw 74 (seen in FIG. 4) to contact connector shank 13 (FIG. 1b) at a point between shoulders 17 such that upward or downward movement of connector shank 13 will bring shoulders 17 into contact with set screw 74. However, this collar 17 may not be needed on aeration tines 46 and 60 because aeration tines 46 and 60 will generally have a smaller diameter than sod cutting tine 1 and therefore will produce less friction between the walls of the tine and the surrounding soil. Thus, tines 46 and 60 will require less force to withdraw them from the ground. For example, the illustrated embodiments of aerator tines 46 and 60 have an OD of approximately 1 inch while the illustrated sod cutting tine 1 has an OD of approximately 2 inches. Therefore, the illustrated embodiments of aerating tines 46 and 60 generally do not require connector collars 15 in order to be held securely in the tine head 76 of the turf aerator (seen in FIG. 4). However, the methods of attaching any of the disclosed tines to the tine head 76 is not critical to the operation of the invention and any conventional attaching means comes within the scope of the present invention.

Aeration tine 46 is superior to aeration tine 60 shown in FIG. 3c because there is a considerably lesser tendency to compact the soil. When the cutting tip 40 of aeration tine 60 is driven into the ground, the tapered sides 63 tend to press soil to the side and further compact it. On the other hand, aeration tine 46 will allow the soil to enter cavity 49 when tine 46 is driven into the ground. When tine 46 withdraws from the ground, the soil in cavity 49 will generally be withdrawn with tine 46 rather than being compacted against the surrounding soil. On the next stoke, tine 46 will again enter the ground and force more soil into cavity 49. As additional soil accumulates in cavity 49, the earlier captured soil will be forced against inclined wall 51. Inclined wall 51 will in turn direct the soil through outlet 52. In this manner, soil is ejected from tine 46 each time the tine is driven into the ground.

It will be understood that the effect of the embodiments illustrated in FIGS. 1 and 2 is to uniformly implant small amounts or "plugs" of sod across the entire area that is harvested simultaneously with the harvesting process. This allows the entire field of sod to be harvested rather than leaving a large percentage of the sods in strips as the prior art required for regrowth. In addition to greatly increasing the yield when harvesting sod, the present invention provides additional advantages. For example, the sod that has been harvested now has a large number of apertures formed therethrough. While the apertures are not large enough or spaced together closely enough to adversely affect the structural integrity of the sod section, the apertures do provide desirable aeration of the sod. Those skilled in the art will undoubtably identify additional advantages and many obvious variations of the method and apparatus disclosed herein. All such variations are intended to come within the scope and inventive intent of the following claims.

We claim:

1. A sod cutting tine comprising:
   a. a body having a sod plug retention cavity formed therein;
   b. a cutting surface positioned at a lower section of said body such that said cutting surface will cut a plug of sod upon said plug entering said plug retention cavity;
   c. a connector attached to said body such that said body may be fixed to a device for driving said body into the sod; and
   d. a plug ejector slidably positioned within said plug retention cavity, said plug ejector being biased in a direction away from said connector.

2. A sod cutting tine according to claim 1, wherein a biasing device is positioned between said connector and said ejector.

3. A sod cutting tine according to claim 2, wherein a biasing device is a spring.

4. A sod cutting tine according to claim 1, wherein said connector is an end cap attached to an upper section of said body and having a threaded aperture formed therethrough.

5. A sod cutting tine according to claim 1, wherein said cutting surface is formed on a cutting tip and said cutting tip is formed separately from and is removably attachable to said body.

6. A sod cutting tine according to claim 5, wherein said lower section of said body has a first connector half and said cutting tip has a second connector half adapted for mating engagement with said first connector half.

7. A sod cutting tine according to claim 6, wherein said first and second connector halves are threaded.

8. A sod cutting tine according to claim 1, wherein said cutting surface forms a cutting edge and said cutting edge tapers outward from a bottom end of said cutting edge.

9. A sod cutting tine according to claim 1, wherein said tine is connected to a device for driving said tine into the soil.

10. A sod cutting tine according to claim 9, wherein said device for driving said tine into the soil further comprises multiple tine heads and said device drives said tine heads into the soil at predetermined intervals.

11. In a section of sod to be harvested from the ground by removing said section of sod at a predetermined depth below a surface of said section, a harvesting method comprising the steps of:
   a. inserting into said section of sod a cutting tine having an opening formed within a parameter of a cutting edge such that a plug of sod is separated from said section of sod;
   b. positioning said plug of sod in the ground below said predetermined depth of said section of sod; and
   c. removing said section of sod at said predetermined depth such that said plug of sod remains in the ground when said section of sod is removed.

12. The method according to claim 11, wherein said step of positioning said plug of sod further comprises pushing said plug of sod below said predetermined depth.

13. The method according to claim 11, wherein said process comprises cutting plugs at approximately twelve inches on center.

14. The method according to claim 11, wherein said plug comprises a surface area of sod approximately 2 square inches.

* * * * *